United States Patent [19]

Vangbo et al.

[11] 4,391,667

[45] Jul. 5, 1983

[54] METHOD OF PREPARING CELLS TO ENABLE ONE FLUID TO BE AFFECTED BY ANOTHER FLUID

[75] Inventors: Håkan Vangbo, Järfälla; Bertil Lundin, Sollentuna; Öivind Moklint, Vårby, all of Sweden

[73] Assignee: Aktiebolaget Carl Munters, Sollentura, Sweden

[21] Appl. No.: 256,807

[22] Filed: Apr. 23, 1981

[30] Foreign Application Priority Data

Apr. 25, 1980 [SE] Sweden ............................. 8003175

[51] Int. Cl.³ ........................... B31F 1/20; B32B 3/28
[52] U.S. Cl. ................................. 156/205; 34/32; 55/387; 55/389; 156/210; 156/280; 156/462; 264/286; 428/72; 428/182; 428/281; 428/283; 428/307.3; 428/317.9; 428/408
[58] Field of Search ............... 55/387, 388, 389; 156/77, 205, 462, 210, 280; 428/68, 182, 72, 281, 283, 307.3, 317.9, 408; 264/286; 34/32

[56] References Cited

U.S. PATENT DOCUMENTS

| 3,262,682 | 7/1966 | Bredberg | 261/DIG. 11 X |
|---|---|---|---|
| 3,307,617 | 3/1967 | Munters | 165/10 |
| 3,382,141 | 5/1968 | Arledter et al. | 55/387 X |
| 3,726,706 | 4/1973 | Glav | 427/243 |
| 3,807,149 | 4/1974 | Norback | 55/388 |

FOREIGN PATENT DOCUMENTS

| 206020 | 2/1966 | Sweden. |
| 212488 | 12/1966 | Sweden. |
| 391708 | 1/1977 | Sweden. |

*Primary Examiner*—Robert A. Dawson
*Attorney, Agent, or Firm*—Curtis, Morris & Safford

[57] ABSTRACT

A method of preparing cells for the purpose of enabling one fluid to be affected by another fluid via thin membranes of inorganic artificial fibres, which membranes are corrugated all over or in part and caused to bear upon each other along discrete lines of contact so as to form through passages or compartments for the fluids. The cell is constructed of membranes of artificial fibres which have a filament diameter of at least 3 and at most 20 micrometers and are elastic. The fibres are loosely matted so that when the spaces between the fibres in the assembled cell have been filled with a fine powder which is bound with an inorganic binder the powder forms a load-bearing layer which is cohesive throughout the surface extension of the membrane and through its cross-section and in which the fibres act as reinforcement.

13 Claims, No Drawings

METHOD OF PREPARING CELLS TO ENABLE ONE FLUID TO BE AFFECTED BY ANOTHER FLUID

The present invention is concerned with a method of preparing cells for the purpose of enabling one fluid to be affected by another fluid, at least one of which fluids is a gas. In one important field of application of the invention such cells or contactors are intended for use in regenerative exchangers for heat and/or moisture between two streams of gas (air) which pass through the cell via separate zones, while the cell and the inlets and outlets for the two fluids describe a relative motion, e.g. through the cell being rotatable in a stationary casing. The cell is composed of thin membranes which are corrugated all over or in part and then caused to bear upon each other discrete lines of contact so as to form through passages or compartments.

The membranes have hitherto been made, for example, of fibre paper of cellulose or asbestos, which is impregnated to secure the necessary mechanical strength, and various types of resin and also inorganic substances have been used to make membranes difficult to burn. In cases where it is desired to remove a component of one of the media, e.g. water vapour from air, it is also known practice to impregnate the membranes with substances having a desired property such as hygroscopicity. It is furthermore known in the art to make contactors or cells of plastics film or aluminium foil and of sheets of ceramic materials. Examples of publications containing applications of these prior-known methods are Swedish Pat. Nos. 206,020, 212,488, 222,134 (U.S. Pat. No. 3,307,617), 307,963 (U.S. Pat. No. 3,262,682), 350,329 (U.S. Pat. No. 3,807,149), 391,708 the disclosures of which are incorporated herein by reference as applicable.

Attempts have also been made to make cells of inorganic artificial fibres or mineral fibres, such as glass wool. Unlike the asbestos fibre, which is composed of bundles of extremely fine so-called fibrils, these fibres are unifilar, making it possible to select a filament diameter large enough to eliminate any environmental and health risks due to the inhalation of fine suspended fibre particles. At the same time, however, the large fibre diameter makes the fibre membranes difficult to process inasmuch as the fibres are elastic and do not soften when deposited, in aqueous suspension, on the wire of a wet machine. The fibres cannot be felted together as cellulose or asbestos fibres can. Hence the resulting fibre structure is permeable, with open spaces between the fibres. It has now been found possible to manufacture a cell of unifilar mineral wool having excellent properties with respect to rigidity and mechanical strength and also high efficiency, e.g. in transferring heat and water vapour between two air streams.

The invention is essentially characterized in that the cell is constructed of membranes of artificial fibres, which are at least 3 and at most 20 micrometers in diameter and are elastic and loosely matted, so that when the spaces between the fibres in the assembled cell are filled with a fine powder bound by an inorganic binder, the powder forms a load-bearing layer which is cohesive both throughout the surface extension of the membrane and through the cross-section thereof and wherein the fibres serve as reinforcement.

Inasmuch as the glass fibres cannot be felted to a cohesive sheet on a wet machine in the same manner as cellulose or asbestos fibres, the glass fibres in the paper are comparatively loosely matted, making the paper permeable, so that a gaseous fluid can pass through it with little resistance. Such a paper is unsuitable for, e.g. a regenerative heat/moisture exchanger of the abovementioned type wherein the two fluid streams are required to flow through the passages of the cell without mixing with each other.

According to the invention, the glass wool papers may be corrugated and the membranes united to each other before any filler is added to the paper and hence while the paper consists substantially of fibres. If the glass-wool paper were finished with the filler in question beforehand, as is done with cellulose paper, the paper would break up in the corrugating machine. On the other hand, the invention provides the ability to add powder to the fibrous structure in the semi-finished cell in sufficient quantity to endow the cell with outstanding rigidity and mechanical strength and with such other properties as are necessary for the proper performance thereof.

The fibre paper contains, according to the invention, artificial, e.g. extruded, fibres of mineral wool such as glass wool or slag wool. The paper or membrane is given a thickness between 0.1 and 0.25 mm. The diameter of the unifilar fibres is preferably in the range 5–10 micrometers, while their length may be 5–15 mm. The weight of the paper may be in the range of 15–60 g/m$^2$ and preferably in the range 20–40 g/m$^2$. Because of the loose texture of the mineral fibres the volume of the fibres is low in relation to that of the paper, namely as little as 5 to 15%.

A cell, e.g. for a regenerative exchanger, is preferably manufactured by first bonding together by means of an adhesive alternate smooth and corrugated webs of mineral paper in a corrugating machine to form so-called single-faced corrugated board, which is then coiled spirally to a cylindrical roll or rotor of the desired diameter, the coils of single-faced board being likewise bonded to each other by an adhesive. This gives a structure having parallel fluting tubes passing between the two plane faces of the rotor and separated from each other by the lines of contact between the membranes. The bonding agent between the membranes along their lines of contact may be an organic adhesive, which may be of thermosetting type if desired, such as polyvinyl alcohol, or in certain cases an inorganic adhesive such as waterglass.

Once a semi-finished cell of mineral fibre paper has been built up in this way the membrane structure is filled with a powder which serves, on the one hand, to impart rigidity and mechanical strength to the cell and, on the other hand, to make the membranes impervious through the thickness thereof. The powder serves moreover to increase the active surfaces of the membranes for the desired exchange between the two fluids, and to improve the efficiency of the exchanger in other respects, e.g. its drying capacity if used in a dehumidifier. Because of the loose texture of the fibres in the paper the weight of powder added must exceed the weight of the fibre membranes. Thus the weight of powder may be at least 25% to 40% greater than the weight of the fibre membranes.

If the cell is to be used in a dehumidifier for the drying of an airstream the filler may have hygroscopic properties, as is the case with molecular sieves, silica gel or aluminium hydroxide or a mixture thereof. However, the filler may also consist at least in part of kaolin or similar substances. The filler is applied to the membranes by impregnation in the form of a slurry with a liquid such as water, whereafter the cell is dried. It now has just sufficient mechanical strength to permit impregnation with one or more substances which bond the grains of powder to each other and to the fibres. An example thereof is waterglass, which may then be converted into a form insoluble in water, silicon dioxide, by treating with carbon dixoide, e.g. as described in U.S. Pat. No. 3,726,706. The waterglass may also be reacted with a substance such as a salt, e.g. calcium chloride, which yields an insoluble silicate as final product. The cell may be burnt out in a previously known manner as described in Swedish Pat. No. 223,182 in order to render the final product completely incombustible, i.e. free from organic bonding agents used for bonding the fibres into membranes (usually in a quantity of approx. 10 percent) and possibly in the assembly of the cell.

The filler in the membrane structure may consist of activated carbon or other powdered organic substances such as polymeric adsorbents, especially if the cells are to be used for cleaning gas or air from gaseous impurities.

The passages formed by the fibre membranes in the cell or rotor are of small cross-sectional area in a manner previously known. Thus the average distance between the membranes may be less than 3 mm, e.g. in the ranges 0.5–1.5 mm. As the membranes are alternately smooth and corrugated, this implies that the spacing of the smooth membranes is less than 6 mm and preferably around 1–3 mm.

As the thickness of the glass-fibre paper must lie within a certain range, as previously mentioned, to enable it to be corrugated, the volume of filler taken up by the resulting structure may be too small to provide the desired properties for certain applications. In a further embodiment of the invention this may be remedied, in cases where the structure is built up of alternate smooth and corrugated membranes, by making the smooth membrane thicker than the corrugated one. Hence the smooth membrane will contain or take up more filler and hence the desired quantity of filler can be obtained in the structure within a given overall volume.

EXAMPLE

A rotor was made of glass-fibre paper composed of glass fibres with an average diameter of 6.3 micrometers. The thickness of the paper was 0.2 mm. Two webs of paper 20 cm wide were bonded together with an adhesive in the form of polyvinyl alcohol, after one of the webs had been corrugated to a corrugation height of 2 mm, to form a so-called single-faced corrugated board. The single-faced web was then coiled into a cylindrical rotor, the coils being bonded to each other at the corrugated strand of the web. The semi-finished cell so formed had a bulk density of 50 kg/m$^3$. An aqueous slurry of finely powdered molecular sieve was then applied to the fibre membranes in such quantity that the bulk density of the rotor, after the water had been driven off by boiling, was 120 kg/m$^3$, i.e. the membranes had taken up a quantity of powder which considerably exceeded the weight of the glass-fibre membranes themselves. In the next stage of fabrication the powder filling in the fibre structure was stabilized by means of a waterglass solution in the form of sodium silico-hydroxide in water. Silicon dioxide was then precipitated by treatment with CO$_2$ as described in U.S. Pat. No. 3,726,706. The said silicon dioxide was converted into a solid, insoluble form by heating the rotor to 350° C. or more, whereafter the rotor structure possessed the required mechanical strength. This heating removed the organic components of the cell as described above. The ultimate bulk density of the rotor was 160 kg/m$^3$.

Since the density of the powder may be taken to be approximately equal to that of the glass fibres, it follows from the foregoing that the volume of powder is greater, and preferably considerably greater, than the volume of the glass fibres through the cross-section of the paper or membrane. In view of the loose texture of the fibres the quantity of powder must be great enough to render the membranes practically impermeable to gas. By this means the individual passages in the rotor are laterally separated from each other.

The filler may consist of powdered activated carbon in a quantity of 75–150 kg/m$^3$ in a rotor constructed in accordance with the above example. Thus the quantity of powder may be several times the weight of the fibre.

The quantity of powder may be so great that the impregnated membrane is thicker than the original fibre membrane and hence exceeds the thickness of the fibres. In this case as well, after stabilization and binding of the powder, a layer of powder is obtained which is cohesive through the cross-section thereof and in which the fibres act as central reinforcement.

The invention also finds application in catalyst carriers and similar devices wherein only one fluid passes through the cell.

While the paper webs are preferably corrugated and united with each other before the paper is caused to absorb any filler, limited amounts of filler may in certain cases be present in the paper before these operations.

We claim:

1. A method of manufacturing a cell of the type having a plurality of passages therethrough and further of the type in which one or more fluids may selectively be passed through the passages, said method comprising the steps of:

forming a plurality of thin membranes from mineral fibres, said fibres having a filament diameter in the range of about 3 to 20 micrometers and being loosely felted together, corrugating at least some of the membranes, adjacent membranes being bonded to each other by a bonding agent whereby the corrugations form with adjacent membranes the passages of the cell, adding a fine powder filler to the formed membranes in an amount which by weight exceeds the weight of said formed membranes whereby the mineral fibres are embedded with the filler to form therewith a composite member and to provide said membranes with an increased active surface area, and impregnating the formed powder filled member with an inorganic binder whereby the bound powder filler forms a load-bearing layer which is cohesive throughout the increased surface area of said membranes and through the cross-section thereof and whereby said fibres serve as reinforcement for said composite reinforced member.

2. A method as defined in claim 1 wherein the membranes are alternately non-corrugated and corrugated sheets.

3. A method as defined in claim 2 wherein the non-corrugated sheets are thicker than the corrugated sheets.

4. A method according to claim 1 wherein the membranes are paper like in structure and the weight thereof is in the range of about 15 to 60 g/m$^2$.

5. A method according to claim 1 wherein the membranes are paper like in structure and the weight thereof is in the range of about 20 to 40 g/m$^2$.

6. A method according to claim 4 wherein the membranes have a thickness in the range of about 0.1 to 0.25 mm.

7. A method according to claim 4 wherein the powder filler is hygroscopic.

8. A method according to claim 4 wherein the inorganic binder is a compound containing silicon.

9. A method according to claim 4 wherein the weight of the filler is at least equal to the weight of the fibres.

10. A method according to claim 4 wherein the weight of the filler is greater than the weight of the fibres by at least 20% to 50% of the weight of the fibres.

11. A method of manufacturing a cell of the type having a plurality of passages therethrough and further of the type in which one or more fluids may selectively be passed therethrough, said method comprising the steps of:

forming a plurality of thin membranes from glass fibres, said fibres having a filament diameter in the range of about 3 to 20 micrometers and being loosely felted together, corrugating alternate membranes, adjacent membranes being bonded to each other by a bonding agent whereby the corrugations form with the adjacent membranes the passages of the cell, coiling the bonded corrugated and non-corrugated membranes into a cylindrical roll of desired diameter and length, adding a fine hygroscopic powder filler to the glass fibre membranes whereby the fibres are embedded with the filler to form therewith a composite member and to provide said membranes with an increased active surface area, said filler being chosen from the group consisting primarily of molecular sieves, silica gel, aluminum hydroxide or mixtures thereof, and impregnating the formed powder filled member with an inorganic binder containing silicon whereby the bound powder filler forms a load-bearing layer which is cohesive throughout the increased surface area of said membranes and through the cross-section thereof and whereby said fibres serve as reinforcement for said composite reinforced member.

12. A method according to claim 1 wherein the powder filler includes activated carbon.

13. A method according to claim 1 wherein the cell is used as a catalyst carrier.

* * * * *